United States Patent [19]

Maurer

[11] Patent Number: 5,010,992

[45] Date of Patent: Apr. 30, 1991

[54] AXIALLY OPERATING POSITIONING ELEMENT, PARTICULARLY FOR A FRICTION CLUTCH STRUCTURE

[75] Inventor: Ruprecht Maurer, Bad Homburg, Fed. Rep. of Germany

[73] Assignee: Ringspann GmbH, Bad Homburg, Fed. Rep. of Germany

[21] Appl. No.: 460,409

[22] Filed: Jan. 3, 1990

[30] Foreign Application Priority Data

Jan. 27, 1989 [DE] Fed. Rep. of Germany ....... 3902360

[51] Int. Cl.$^5$ .............................................. F16D 13/50
[52] U.S. Cl. ................................ 192/70.27; 192/89 B; 192/99 A
[58] Field of Search ................. 192/70.29, 70.3, 99 A, 192/89 B

[56] References Cited

U.S. PATENT DOCUMENTS

| | | | |
|---|---|---|---|
| 828,647 | 8/1906 | Gibbs | 192/99 A X |
| 2,064,450 | 12/1936 | Spase | 192/70.29 |
| 2,064,499 | 12/1936 | Spase | 192/70.29 |
| 2,219,139 | 10/1940 | Nutt et al. | 192/70.29 |
| 2,682,943 | 7/1954 | Root | 192/99 A |
| 2,725,964 | 12/1955 | Maurer | 192/89 B |
| 4,844,226 | 7/1989 | Taketani | 192/89 B |

OTHER PUBLICATIONS

"Schalt- und Schutzkupplungen", (Switching and Protective Clutches), Ringspann (9/1987, pp. 2-3).

*Primary Examiner*—Allan D. Herrmann
*Assistant Examiner*—Nicholas Whitelaw
*Attorney, Agent, or Firm*—Frishauf, Holtz, Goodman & Woodward

[57] ABSTRACT

To prevent torsion and bending forces from being applied to an operating ring disk system pressing together interdigited elements of a ring disk clutch, and to permit placement of ring disk portions close to each other for maximum engagement force being applied to the clutch, the ring disk system is formed of a plurality of parts (27, 34, 41 45) which are essentially sector-shaped, surround the clutch shaft, and are pivotable about a movable fulcrum (11, 20) which compresses the clutch disks (3, 5). The individually separate ring disk system parts or elements are in outer circumferential engagement to abut each other and to hold the parts in essentially clearance or play-free mutually engaged position, regardless of whether the rings disk system is flat or planar, or deflected into conical shape. Further, the parts are formed with an inner engagement arrangement to hold them in mutually aligned and supported radial position. The parts can, additionally, be held axially in position. Interengaging projection-and-recess arrangements or a circular holding spring coupled to the elements or parts maintains them in the clutch.

22 Claims, 6 Drawing Sheets

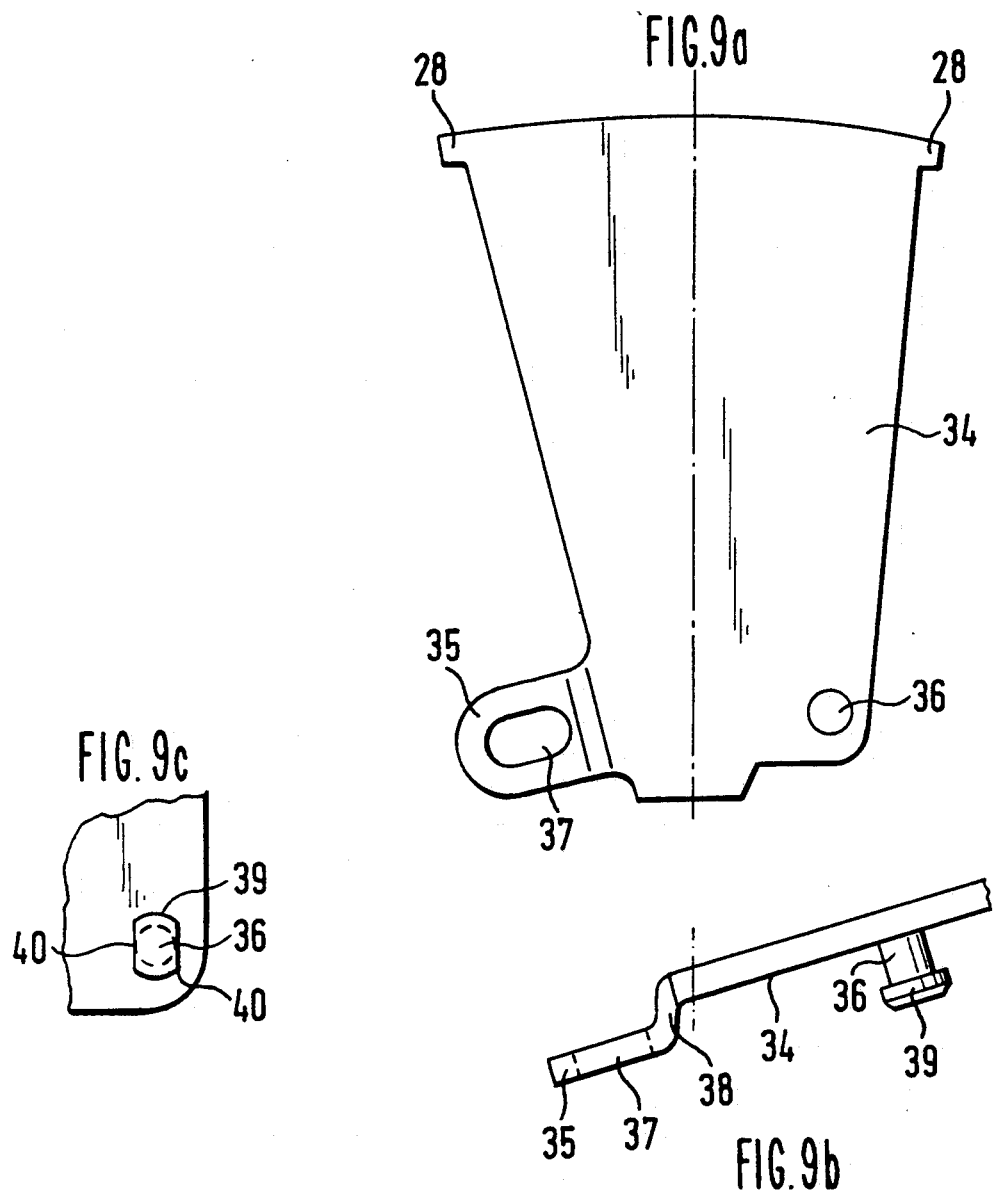

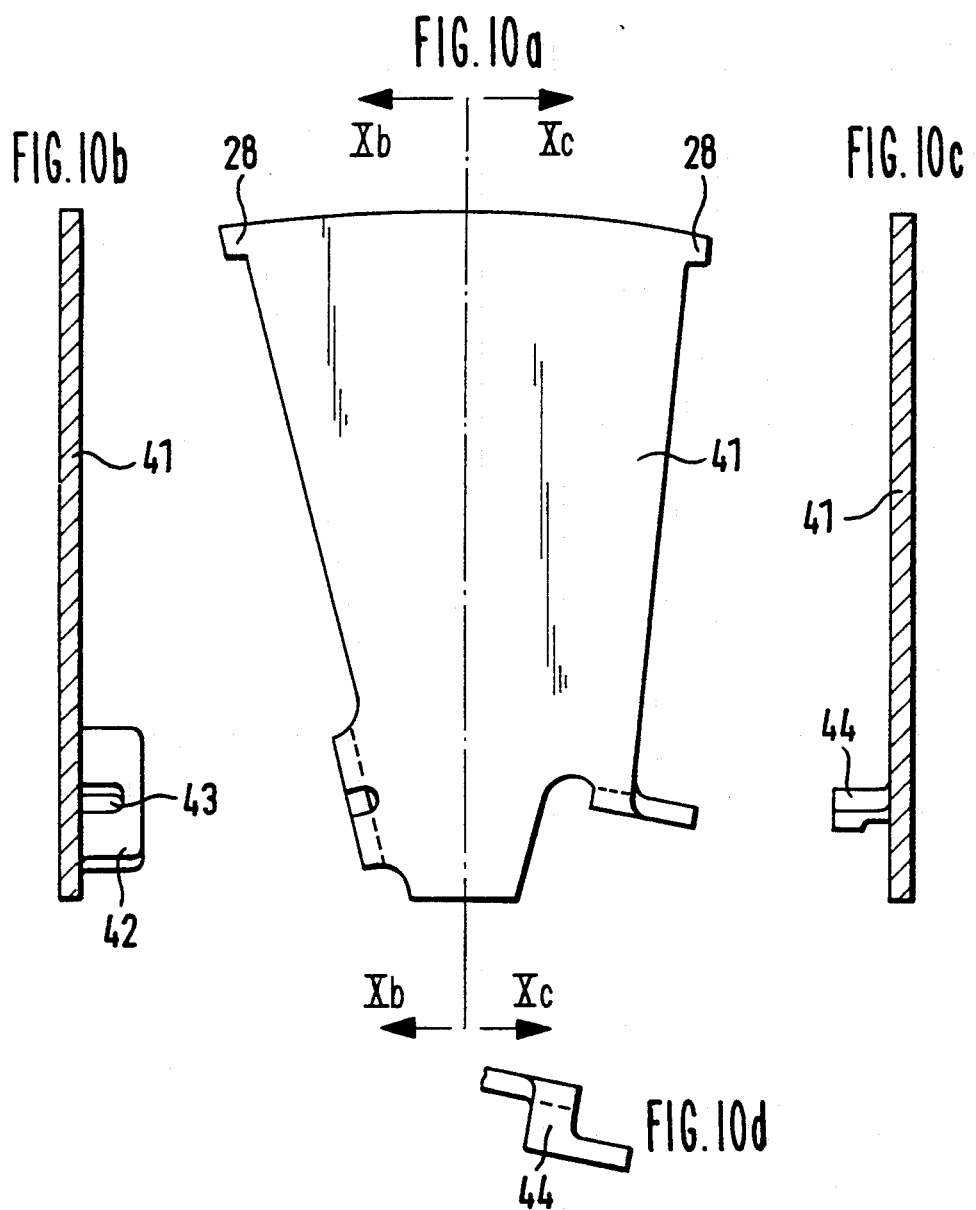

AXIALLY OPERATING POSITIONING ELEMENT, PARTICULARLY FOR A FRICTION CLUTCH STRUCTURE

Reference to related published material:
German Patent 838,094
Applicant's publication "Schalt- und Schutzkupplungen" ("Switching and Protective Clutches"), Ringspann
Reference to related patent, the disclosure of which is hereby incorporated by reference:
U.S. Pat. No. 2,725,964 (to which the above German 838,094 corresponds).

The present invention relates to a positioning element, and more particularly to an axially operating ring plate element to effect axial positioning of structural components, and especially axially shiftable friction clutch disks.

BACKGROUND

Friction clutches are frequently constructed of interdigited or interleaved friction plate elements which are compressed towards each other. One group of the elements is secured to a shaft, the other group of elements is secured to an outer ring, coaxial with the shaft. When the ring elements and the shaft elements are pressed together, a friction connection of the clutch is effected.

Engagement and disengagement is controlled by a positioning element which can be deflected between a plane, essentially flat, radially extending position to a conical position. This arrangement permits application of force on the positioning plate along, for example a central portion thereof, with lever multiplication of the force in radially spaced regions. Such plates, typically ring plates, surrounding one of the shafts of the clutch are described in the referenced U.S. Pat. No. 2,725,964, to which German Patent 838,094 corresponds.

Ring plates or ring disks which permit deformation between a flat, planar shape, in accordance with the prior art, are formed with slits, which alternately extend from an inner or central opening towards the circumference, and from the circumference towards the central opening. These slits are usually longer than half of the radial width of the ring disk. The result of these slits will be the formation of radially extending lever elements, which can operate similarly to double-arm levers or knee levers. Thus, a comparatively small external force, applied in the central region by axial shifting of an operating element, can obtain high compressive force at a circumferential region which can then be applied to a plurality of friction clutch disks. The referenced U.S. Pat. No. 2,725,964 shows such an overall structure and having the foregoing advantage.

Modern high-power machinery requires transfer of higher and higher torques through such clutches and, thus, also require higher and higher surface pressure forces. These forces, preferably, should be capable of being transferred by clutches which have an outer diameter no larger than clutches developed for transfer of lower forces.

To transfer higher torques, the number of friction surfaces brought into engagement with each other can be increased. As the number of friction plates increases, the compression path will have a longer clutching zone between disengaged and engaged positions. For disengaged positions in multi-layer clutch structures, a certain predetermined minimum distance between the pairs of the friction elements is required.

There are limits beyond which changes in material thickness will not result in proportionally increased transfer of forces. If a ring disk is made thicker, the torque transfer capability does not rise linearly with the increase in thickness thereof. Apparently, the radial elements formed by the alternate placement of the radial slits in the ring disks are subject to a bending load caused by the actuating force of the clutch. However, each radial element is connected, at its radially inner and outer end, to a neighboring radial element. When the ring disk switches in position from a plane to a cone, a torsional loading of the elements occurs. Superimposed on this torsional load and on the bending load mentioned above is a load extending in circumferential direction of the ring disk. This circumferential load arises since, upon switch-over between disengaged and engaged position, the size of the inner circumference decreases as the disk is changed from planar to conical shape or position. Thus, an additional bending load is applied to the radially extending disk elements, projecting between the respective slits, and placing a load in circumferential direction.

Increasing the thickness of such a disk, and thus strengthening the radial disk elements, thus does not lead to a proportional increase in torque transferring capability. Of course, the thickness of the disk cannot be increased beyond some predetermined values.

Providing more slits and narrower disk elements likewise will not lead to a proportional increase in clutching force. The radial slits of the ring disks, in order to prevent deformation and notch effects, and stresses at end of the slits which may lead to fissures, must be terminated with comparatively large-diameter essentially circular surface contours. The size of these surface contours, again, depends on the thickness of the ring disk. As the thickness of the ring disks increases, the contours must be formed with diameters which likewise increase so that fissures, which might arise due to notch effects and localized stresses can be avoided. Consequently, the spacing between adjacent radially extending elements increases or, alternatively, the danger of fissures due to notch effects increases.

Comparatively large-diameter end surfaces require a comparatively wide slit which, again, reduces the width of the elements of the ring disks which in turn reduces the positioning surface available in the outer circumferential regions. Reducing these positioning surfaces results in a reduction of force transfer capability, so that increase of torque or rotary force cannot be obtained by merely increasing the thickness of the material of the ring disk beyond design values which result from compromise between material damage and material fatigue at the ends of the slits and width of the slits.

The above discussion is applicable to all ring disks of the known prior art type. The width of the radial slits, in the end, must be determined by the required dimensions of the ends of the slits to avoid the danger of fissures and notch effect and localized stresses, so that increase of the positioning surface by decreasing the width of the slit is limited. Additionally, the radially projecting elements of the ring disks are stressed both in torsion as well as in bending, which combined stresses limit the power or force transfer capability. Consequently, increasing the torque transfer capability of clutches using such ring disks by merely changing its material and/or size and thickness has economic and technical limits.

THE INVENTION

It is an object to provide a deflectable positioning element which can switch between planar and conical shape which, while maintaining the general aspect of the prior art structure, so that it is interchangeable therewith, and which, without essential change of dimension, permits an increase in the transfer force, preferably without essential limits to such force transfer capability. The positioning element should, additionally, be simple and inexpensive to make.

Briefly, the positioning element is subdivided into a plurality of separate parts of generally sector shape, the parts being formed with outer circumferential engagement elements which abut each other and hold the respective parts in essentially clearance or play-free position regardless of the axial position of the parts, that is, whether plane or flat, or arranged in conical form. The parts are further formed, along an inner surface, with interengaging elements, that is, with elements located inwardly of the outer engagement elements, and positioned for mutually interlocking of the parts with respect to radial movement thereof.

Forming the separate parts effectively eliminates bending forces being applied thereto upon shifting of the overall structure between a planar and conical configuration since adjacent parts, forming the lever elements which transfer the force, are no longer integral with adjacent parts by a connection formed by the material of the overall structure. Each one of the individual parts, thus, is a separate element, and individually movable, so that the torsional and bending forces which arise due to the end connection of the respective structures in accordance with the prior art no longer occur. Thus, the individual parts can be dimensioned and made to accept only that loading which is due to the lever-configuration causing the clutch-compression forces. Thus, since this is the only force that has to be transmitted by the respective parts, a substantial increase in stressing thereof over prior art structures is obtained.

The parts can be placed close to each other since the minimum width of the slit, due to possible fissures and end notch effects, no longer have to be considered—there are no notches. Thus, the spacing between adjacent parts or sector elements can be so selected that, when they are in essentially planar or flat position, they are next to each other without danger of collision. This permits manufacture of the elements, in circumferential direction, in wider form, which, again, increases the force transfer capability.

The separation of the force transferring parts has the additional advantage that problems of the known ring disks, due to material strength, and material fatigue at notches, are avoided, while permitting substantial increase in the force being applied by the positioning element, for example on a stack or package of clutch plates.

It is, of course, necessary to hold the individual parts in their respective position, next to each other. Consequently, the outer circumferential surfaces are so arranged that they are in engagement with each other, essentially without play. This outer circumference is that region which remains the same regardless of the switching position of the overall structure, that is, between flat and conical shape. When, at the outer circumference, the individual parts or elements are positioned adjacent each other practically without play, the parts or elements cannot shift in circumferential direction.

Shift the elements in radial direction would, however, be possible. In order to prevent such relative shifts of the elements or parts with respect to each other, they are, additionally, interlocked with their neighboring elements in such a way that a radial movement of an element with respect to its neighboring elements is prevented. It is the purpose of this radial interlocking in combination with adjacent components of the friction clutch to prevent the ring disk from falling apart and to prevent the elements from occupying a helical, spiral-shaped position.

The structure has the additional advantage that, without requiring essential, additional costs, substantial increase in power or torque transfer can be obtained; further, the structure is compatible with existing structures, and can be used as a direct replacement element, without requiring any change in the remainder of the positioned apparatus, for example a clutch disk package, while substantially increasing the torque or power transfer. Thus, the ring disk of this invention may replace the prior ring disk in existing clutches, increasing the torque transfer, without changing the engagement/disengagement path, or permitting increase of engagement/disengagement force; it can, also, be used to increase or change the engagement/disengagement distance or path to retrofit existing structures.

Outer circumferential support of the parts or essentially sector-shaped elements with respect to each other can be provided at the outer side of the cone when the elements are switched to accept an essentially conical shape. Projections formed adjacent the outer circumference on the respective parts or elements, and engaging against each other, provide for slight spacing of the elements from each other and permit easy switching between planar and conical position.

The positioning element can be used not only with disk-clutches and the like, but is universally applicable in the machinery field, where it is necessary to move an element over a given and comparatively short path, while applying a high force when the element has shifted. It is particularly applicable to stacked clutches, and the invention will be explained with reference thereto, although it is not limited to such an application.

DRAWINGS

FIG. 9a is a plan view of a part or element, similar to FIG. 3, and illustrating another embodiment;

FIG. 9b is a side view of the embodiment of FIG. 9a;

FIG. 9c is a fragmentary detail view illustrating engagement of adjacent elements;

FIG. 10c is a sectional view of FIG. 10a looking in the direction of the arrow Xc—Xc of FIG. 10a;

FIG. 10d is an end view of the hook structure illustrated in FIG. 10a;

FIG. 11b is a side view of one of the elements of FIG. 11a.

DETAILED DESCRIPTION

Figure 1:
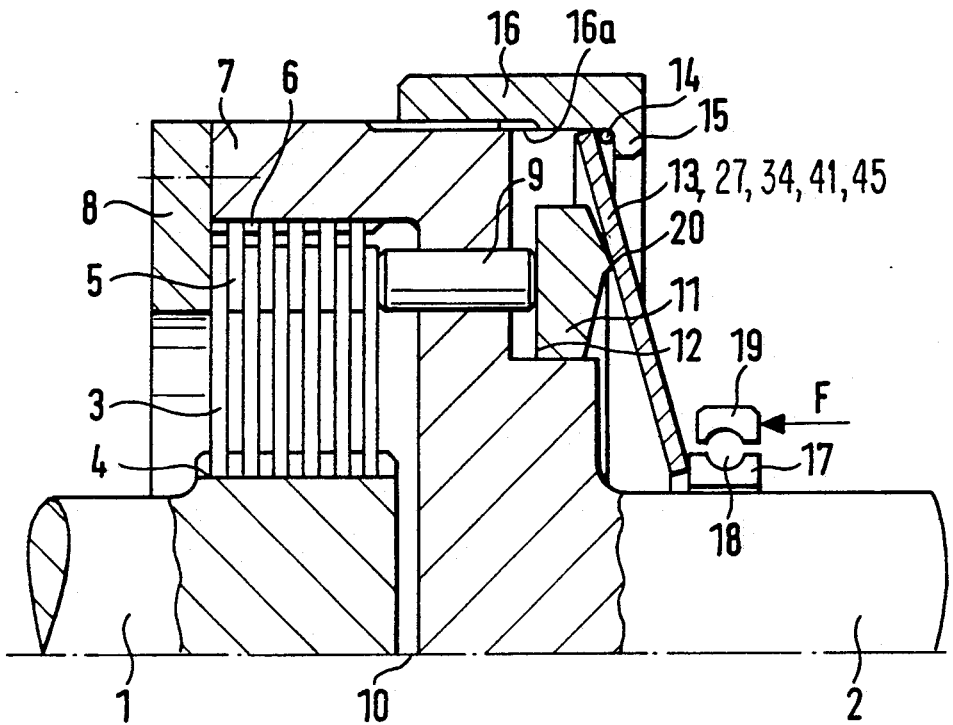
FIG. 1 is a half-radial cross section through a stacked friction clutch showing the clutch in disengaged position.

The present invention will be described in connection with an engageable and disengageable friction clutch, although of course it has other uses as well. As seen in FIG. 1, two aligned shaft ends 1, 2 can be coupled together by interengaging a stack of friction disks 3 secured to the shaft 1 with a stack of friction disks 5 secured via a ring 7, to the shaft 2. The clutch disks 3 are clamped or wedged by a wedge structure 4, axially shiftably secured to the shaft 1. The disks 3 are spaced from each other and outer friction disks 5 engage between the disks 3 in interdigited or comb position. The outer disks 5 are secured to an outer wedge structure 6, which, in turn, is axially shiftably located on a flange 7, formed on or coupled to the shaft 2. The flange 7 is closed off at the left side (with respect to FIG. 1) by a releasable cover ring 8, which extends radially inwardly over that region in which the ring disks 3, 5 interengage.

A plurality of engagement pins or bolts, forming pressure elements, are axially shiftable, parallel to the axis 10 of the clutch, uniformly distributed over the circumference, and retained in the flange 7 of the clutch structure. The radial position of the pins 9 corresponds to the mutual engagement regions of the clutch disks 3 and 5.

The pins 9 engage, at the left side (FIG. 1) against the package of friction disks 3, 5; at the right side, the pins are in engagement with a positioning element 11, formed as a positioning ring, which is axially shiftable, concentric with respect to the shaft 10, on a shoulder or support surface 12 of the flange 7. By axially shifting the ring 7, the pressure pins 9 will engage the stack or package of friction disks 3 and 5, to press the friction disks against each other, or, when disengaged, to permit the clutch connection to be severed.

The shifting operation of the ring 11 is obtained by a lever element in form of a ring structure 13 which engages with its outer circumference against a circular wire 14, to provide a counter bearing therefor, opposite the ring 11. Wire 14 has a circular cross section. It is held in position by a shoulder 15 of an outer ring 16, screwed on the flange 7. The inner surface 16a of the ring 16 provides a radial engagement surface for the element 13.

A ball bearing 18, having an inner race 17, is located on the shaft end 2. The ball bearing 18 can be shifted axially, as shown schematically by the force arrow F. The ball bearing 17 forms an inner counter engagement surface for the ring structure 13. Axial shifting forces are applied to the outer race 19 of the ball bearing 18.

BASIC OPERATION

Let is be assumed that, in FIG. 1, a force is applied in the direction of the arrow F to shift the ball bearing 18 towards the left, the ring disk 13 will be tipped which applies a force on the switching ring 11. The flange 16 and the circular wire 14 remain fixed in position on the flange 7 secured to the shaft 2. The positioning force, thus, is transferred to the switching ring 11 which force, then, is transferred via the pins or bolts 9 to the clutch disks 3, 5 which compresses the disks 3, 5 and thus engages the clutch. For disengagement, the force F is reversed or released, and the disk 13 will return to the position shown in FIG. 1. This operation is well known, and need not be described in greater detail. The referenced U.S. Pat. No. 2,725,964 provides further details with respect to the operation.

As can be clearly seen, the ring disk 13 operates, upon switching of the clutch, in form of a double-arm lever due to the constraint by the flange 16 and wire 14 on the one side, and the ball bearing 18 on the other. The fulcrum of the lever is on the switching ring 11 which, in a preferred form, is formed with a fulcrum edge 20 at the contact point with the disk 13. This operation will be the same regardless of whether the element 13 is as shown in FIG. 2, of the prior art structure or formed in accordance with the present invention, as will appear.

The ring disk 13 is visible in FIG. 1 only in cross section; FIG. 2 illustrates this disk in perspective view, which clearly shows that it includes, distributed symmetrically about the circumference, a series of slits 21, 22 which extend, alternatingly, from the inner edge 23 and from the outer circumferential edge 24. They extend in elongated form for a distance greater than half the radial width of the disk 13. Consequently, the disk 13 forms a plurality of radial elements 25, uniformly distributed about the circumference, which individually form the tilting levers pivoting about the fulcrum 20 (FIG. 1) in order to operate the switching ring 11.

Figure 2:
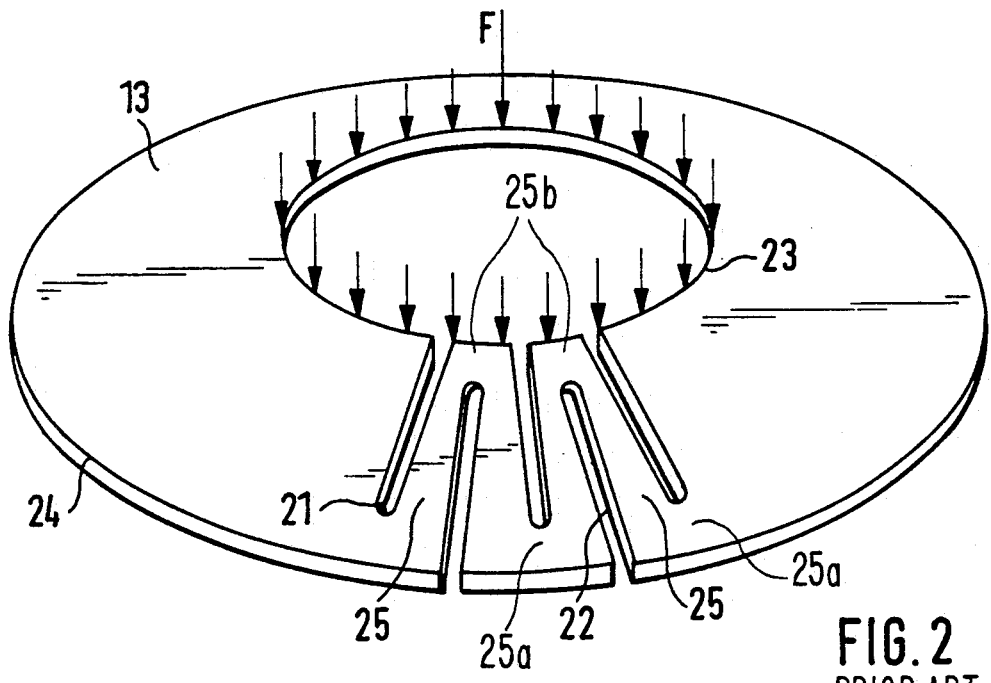
FIG. 2 is a perspective view of a prior art ring disk.

The structure of FIG. 2 corresponds to that shown in FIG. 2 of the referenced U.S. Pat. No. 2,725,964, Albrecht Maurer. The slits, of course, are distributed over the entire circumference of the disk 13, FIG. 2 illustrating only a portion thereof in slit form for ease of illustration.

As previously described, the elements 25 are substantially stressed due to torsion about a central axis corresponding to a radius of the ring disk, when the ring disk is shifted in position between a conical form, shown in FIG. 2, and the straight or flat form shown in FIG. 1. The reason for this torsional stress are the bridge portions 25a, 25b which connect the elements 25 at the outer and inner circumference, respectively, with adjacent elements. The bending stresses to which the disk 13 is subjected when it switches between the conical shape (FIG. 2) and the flat shape (FIG. 1) requires that the inner ends of the slits 21, 22 adjacent the bridge portions 25a, 25b are rounded, with as wide a radius as possible in order to prevent breakage due to fissures caused by edge or notch-effect forces. The rounding of these slits then requires that the slits 21, 22 have a certain minimum width, which reduces the quantity of material available, in circumferential direction, of the ring disk, and which, then, cannot be used to transfer forces for engagement of the clutch or for maintenance thereof in engaged position. When not applied to a clutch, it reduces the overall force capable of being transferred by such a ring disk.

In accordance with the present invention, the element 13 is replaced by a plurality of elements which are separate from each other. Various embodiments and structures are possible and will be explained.

Figure 3:
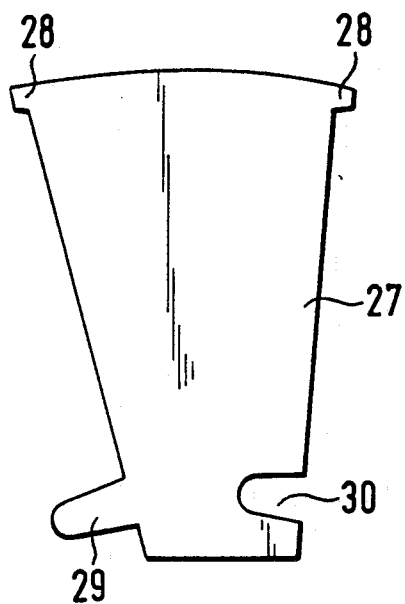
FIG. 3 is a plan view a disk part or element in accordance with the present invention.
Figure 4:
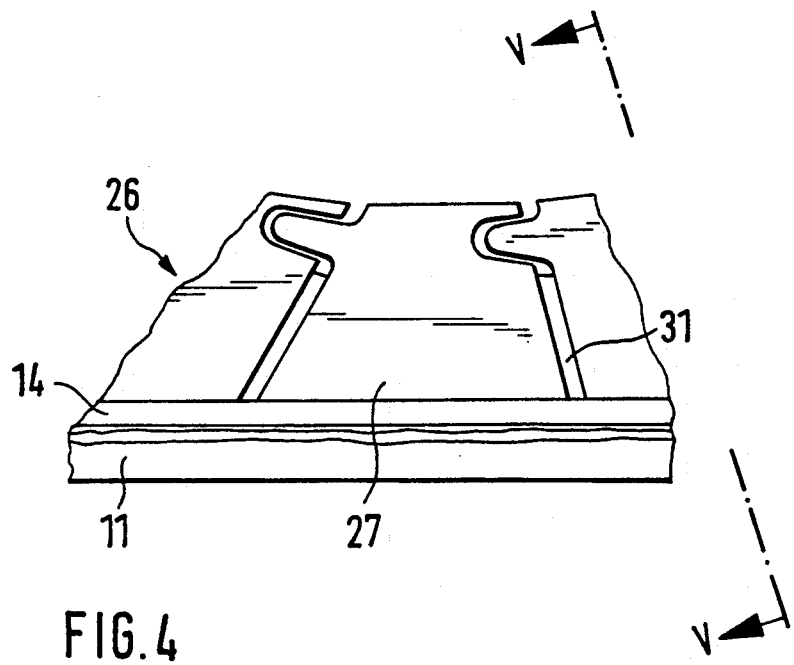
FIG. 4 is a fragmentary radial view of disk parts or elements, in conically deformed position.

Referring first to FIGS. 3 and 4, in which FIG. 4 is a fragmentary view, taken in radial direction, of a ring system 26, deformed in cone shape, so that the illustration corresponds to a fragment of FIG. 2. Individual separate force transmitting plate-like parts or elements 27 are located next to each other, in engagement with the circular wire 14 and with the switching ring 11 as well as with the ball bearing 18 (FIG. 1). The individual elements or parts, of which one is shown in FIG. 3 in plan or axial view are generally segmental and, engage at their outer circumference along small projecting portions 28, so that the system 26, forming a composite disk system, will be continuous and without interruptions and gaps at the outer circumference. Preferably, the parts are placed against each other so that the projections 28 of adjacent elements can abut, that is the overall system or assembly 26 does not provide for play at the circumference in circumferential direction.

Radially inwardly of the outer circumference, that is, inwardly of the position in which the elements 26 are engaged by the switching ring 11, the elements are formed on one side with an engagement projection 29 which fits into an engagement notch 30 at the other side of an adjacent element 27 to provide for an interlocking, interengaging projection-and recess fit. This provides for radial mutual support of the elements 27 with respect to each other, so that they cannot shift mutually. Thus, adjacent or neighboring elements 27 have the projection 29 fitted into the recess of the next element, looked at in circumferential direction of the ring system 26. The projections 29 and recesses 30, looked at again in circumferential direction, must be so shaped that they can shift, when engaged, and when the system 26 is deflected between conical and flat position. FIG. 3 illustrates the projections 29 lifted slightly out of the innermost depth of the recess 30. The projections 29 and the recesses 30 must be so dimensioned that, when flat, they will still fit. The projection 29 and the recess 30 must be so constructed that their edges do not interfere between shifting of the respective elements between conical and flat position. Thus, the contours of the projections 29 and the recesses 30 must be capable of providing for sufficient clearance so that, looked at in radial direction of the system 26, the pivoting movement of the lever arms formed by the interference at the interengaging projections 29 and recesses 30 is possible without interference.

FIGS. 3 and 4 clearly show that the new system 26, replacing the single disk 13 (FIG. 2),will no longer be subject to torsion and bending loading, as previously described, since the individual elements or parts are separated from each other, and no longer form a unitary structural element. The problems which arise which fissures and notch-effect stresses likewise are eliminated since the slit 31 (FIG. 4) can be held to such a small dimension that, when the system 26 is in the flat position (FIG. 1), the clearance between adjacent elements 27 can be effectively zero. Thus, over the entire circumference of the system 26, little material is lost which can transfer switching and clutch engagement forces, since the circumference of the system 26 has as much material as can be accomodated without regard to notch-effect stresses.

Figure 5:
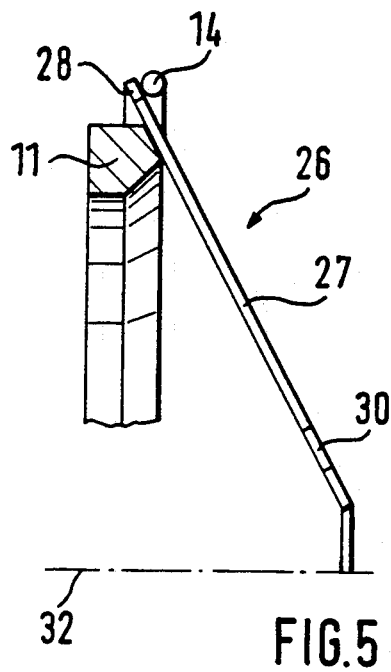
FIG. 5 is an axial fragmentary sectional view along line V—V of FIG. 4.
Figure 6:
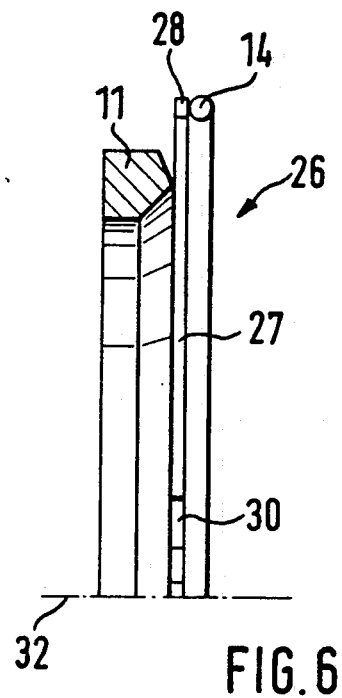
FIG. 6 is a fragmentary side view of the structure of FIG. 5, with the positioning element in flat or planar position.
Figure 7:
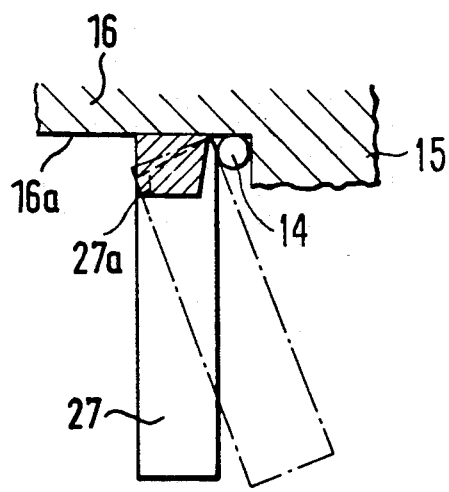
FIG. 7 is a fragmentary end view of the structure of FIG. 1, with the parts of FIGS. 3-6.

FIGS. 5–7 are schematic part-sectional views illustrating how force transfer to the ring 11 is obtained, utilizing the system 26 of FIGS. 3 and 4. FIG. 5 is a fragmentary sectional view with respect to the axis of rotation 32, taken along section line V—V of FIG. 4, and illustrating the system 26 when in conical position; FIG. 6 is a view similar to FIG. 5, but illustrating the system 26 in flat, clutch-disengaged position; and FIG. 7 is a fragmentary cross-sectional view to a substantially enlarged scale with respect to FIG. 1, of a circumferential end portion of one of the elements 27. As can be seen by comparing FIGS. 5 and 6, the change between conical (FIG. 5) and planar position (FIG. 6) occurs at one side of a plane, defined by the planar position of the plate-like elements 27.

Figure 8:
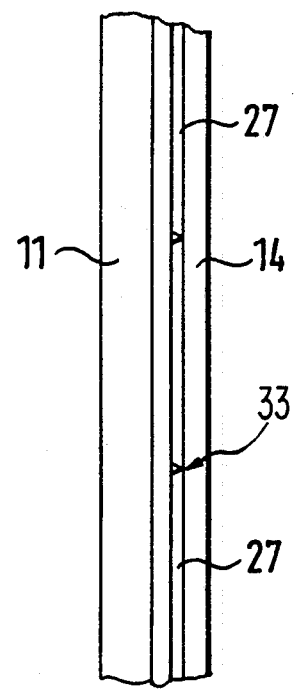
FIG. 8 is a developed top view of the structure of FIG. 6.

The projections 28 can be so arranged that they overlap, in which case they are relieved at opposite planar sides, so that, in order to maintain essential engagement of the elements 27 along their radial lines, they will not interfere with respect to each other when they shift from conical position (FIG. 5) into flat position (FIG. 6). FIG. 8 illustrates, in developed top view, the relief in form of a V-shaped notch 33 between adjacent projections. The roots of the notches are located at the outer circumference of the cone, when the system 26 is in conical position. As best seen in FIG. 8, this position is close to the counter bearing formed by the circular wire 14. FIG. 7 illustrates a single element 27 in flat position (FIG. 6) in solid lines, and in conical position (FIG. 5) in chain-dotted lines. This clearly shows that, upon transition of one of the elements from flat position into conical elements, the end surface of a projection 28, with respect to the tilt axis of the system 26, travels radially inwardly. This has the result that the outer circumference will have a lesser diameter, with respect to the axis of rotation of the system 26, in which, of course, in circumferential direction, there is less space available. This circumferential circle becomes less the farther away the respective elements, shown cross-hatched, are moved from the circular wire 14, when the system 26 is in conical position. The longer the distance from the wire 14, the larger the relief of the projections 28. No change of the circumference diameter of the system 26 occurs immediately adjacent the wire 14 which forms a counter bearing for the outer contour of the individual elements or parts 27. Only at these points is engagement of the elements of the system 27 with respect to each other, without play, actually ensured. This position, however, as above noted, is at the outer side of the cone which the system 26 forms when it is in its conical position.

In some instances it is possible that the system 26 is moved towards the left, with respect to FIG. 7, farther than a vertical position as shown in FIG. 6. To permit such a movement with respect to the inner surface 16a of the overlapping flange 16 (FIG. 1), the outer edges of the elements 27 are relieved in a direction away from the axial engagement with the wire 14, as schematically shown by the relief line 27a, and the then visible cross-hatched portion of the thickness of the element 27.

As best seen in FIGS. 3–6, the projection 29 on the one hand, and the recess 30, on the other, forming an interlocking projection-recess arrangement, will mutually place adjacent elements in radial direction to form a multi-part or multi-element positioning structure or positioning system.

Various changes and modifications may be made, and the elements can be constructed in different form.

Referring to FIGS. 9a–9c: Element 34 is formed with external projections 28; engagement of respective element with each other is effected by a projection 35 on one side, and a pin 36 projecting axially from the element 34, which can be fitted into an elongated hole 37 in the projection 35, to provide for radial engagement of the elements with respect to each other. The projection 35 is offset with respect to the plane of the individual elements 34, as shown at 38 (FIG. 9b) by a distance which corresponds to the thickness of the sheet metal of the element 34.

The radial engagement of the respective elements next to each other can be used, also, to provide for an axial coupling, by forming the pin 36 with a head 39 which is flattened in circumferential direction, as seen at 40 (FIG. 9c), so that it can be fitted into the elongated hole 37 only when first twisted and then, when placed in the position shown in FIG. 9a, locking in radial as well as axial direction. When the two adjacent element 34 then are in normal position, the head 39 will lock in the elongated opening 37. A plurality of such elements can be assembled to form a complete circular disk-shaped plate. The last one of the elements 34 to be assembled should only have the pin 36 without the head 39 for ease of assembly.

FIGS. 10a-10d illustrate another arrangement in which the respective disks 41 are formed with a projection 42 (FIG. 1b) which is bent off the element 41 in axial direction, to project therefrom. The projection 42 is formed with an elongated hole 43. The opposite side of the element 42 is formed with a hook 44 (FIG. 1c), which can hook into the opening 43 of the projection 42 and fit therein. FIG. 10d shows the hook in detail. An interlocking, interengaging projection 44 and recess 43 coupling is thus obtained.

The elongated hole 43, similar to the hole 37 (FIG. 9a), is so shaped that the adjacent elements 34, 41 have freedom of movement with respect to each other to accept the change in dimension of the system when it switches between conical and planar positions.

Figure 11B:
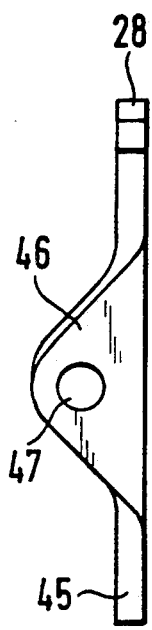
Figure 11A:
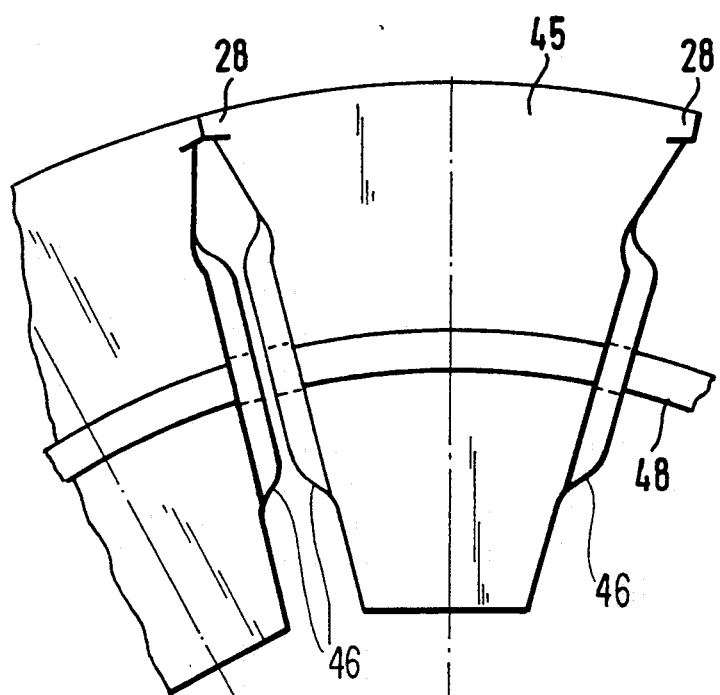
FIG. 11a is a plan view of a plurality of segment-like elements illustrating yet another embodiments.

FIGS. 11a and 11b illustrate another structure which is particularly suitable since it is easy to assemble. The elements 45 have radially extending flaps or tabs 46 formed thereon, bent from the elements 45 at right angles. The flaps or tabs 45 are formed with circumferential bores or openings 47. The adjacent elements 45 are then coupled together by a circular spring 48, passing through the openings 47, for both radial as well as axial coupling of the respective elements 45.

Various other changes and modifications may be made; the elements should be radially and, if desired, also axially engaged with each other. Many different arrangements are possible, and those which are shown merely describe some suitable structures.

The thickness of the materials used for the respective elements 27, 34, 41, 45 should be so selected that, upon switching between planar and conical position of the respective system, the adjacent elements do not collide with each other, and especially do not collide with each other in the region of the projection. The undercuts 33 (FIG. 8) are a suitable and preferred provision, applied to at least one of the facing surfaces of adjacent projections, and extending, essentially, from an axial plane defined by adjacent projections, and so arranged that, when the system 26 is flat, they will retain their external circumferential engagement but permit free movement into conical position of the system.

In a preferred form, the facing surfaces of adjacent projections are so formed that, when the system 26 is in conical position, the facing surfaces are in mutual engagement. This results in minimum undercutting of the projections, so that when the system 26 is flat, the remaining portions provide for external circumferential support under optimum conditions of contact and engagement, with respect to each other and with respect to the circumferential wire 14, for example.

Mutual radial abutment and engagement of adjacent elements is preferably so arranged that, over the path of movement of the system 26 when changing between flat to conical position, the angle of change-over is such that as little play as possible between adjacent elements will result. Axial coupling of the elements with respect to each other ensures that there is no mutual shifting upon change-over between conical and flat position, so that the overall disk shape of the composite force transfer element or multi-part transfer element, and its geometric integrity, is retained. The interengaging arrangement of FIGS. 3 and 4, the interlocking arrangement of FIGS. 9a-9c or FIG. 10a-10d and the the connection arrangement of FIGS. 11a, 11b illustrate various ways in which mutually neighboring plates can be connected.

The embodiment described in connection with FIGS. 3 and 4, by mutually interengaging, interlocking projections and recesses, shaped and dimensioned to provide sufficient clearance to permit shifting of the system between flat and conical shape, is particularly desirable when space is at a premium, and the bending loading on the individual plate elements should be held to lower levels, although high loading can also be accepted. The adjacent projection-recess engagement as illustrated in FIGS. 3 and 4 permits individual application of lever forces, in which adjacent elements do not interfere with each other while still maintaining radial coupling. The clearance between the projections and the recesses should be such that the engagement path, taken in circumferential direction, does not result in mutual interference of tipping or pivoting movement about the fulcrum 20 of the switching ring 11.

Essentially play-free, surface radial engagement of adjacent lever elements is obtained, in accordance with a feature of the invention, by forming the undercut, in circumferential direction, for example in triangular form, in which the triange is symmetrical with respect to a radial line of the axis of rotation of the clutch.

Other arrangements for mutual radial support can be formed by offset projections and engagement pins, as illustrated in FIGS. 9a-9c. Adding the oval head 39, 40 permits assembly by first turning the respective element 34 by 90° to insert the flat sides 40 of the head 39 in the elongated hole 37, and then twisting the element 34 so that head 40 will lock over the rim of the elongated opening 37.

FIGS. 10a-10c illustrate an arrangement in which the hook 44 provides for radial as well as axial engagement support of adjacent parts or lever elements 41, which can be formed directly from the plate.

FIGS. 11a and 11b illustrate an arrangement in which a circumferential spring 48 is threaded through holes 47 formed in flaps or tabs 46, to provide for radial and axial attachment of the respective elements 45.

The connection arrangements of FIGS. 3, 4, 10 and 11 (collectively) have, essentially, the manufacturing advantage that the projections and/or openings, tabs and the like can be made at the same time that the lever part or element is made by punching and, possibly bending operation so that the overall cost of the ring disk system is hardly more than the manufacture of the plate 13 of the prior art.

Various other changes and modifications may be made, and any features described herein may be used with any of the others, within the scope of the inventive concept.

I claim:

1. Positioning apparatus to position a group of movable elements (9) located radially with respect to a shaft (1), optionally forming a clutch operating element to position axially shiftable clutch plates (3, 5), selectively, into and out of engagement with each other, having
   a ring disk;
   circumferential means (14, 15) for supporting the ring disk at an outer circumference thereof and there locating said ring disk at a predetermined position with respect to said shaft;
   movable means (18) engageable with an inner circumference of said ring disk and adjacent the circumference of the shaft, for moving the central region of the ring disk;
   fulcrum means (11, 20) coupled to the movable elements (9) and engaging said disks opposite said movable means (18) at a radial position intermediate the inner circumference,
   said movable means, upon axial movement in direction to and from said fulcrum means, deflecting said ring disk between essentially planar shape or position and conical shape or position while applying a positioning force on said fulcrum means and hence moving said movable elements (9),
   wherein the ring disk comprises a ring disk system (26) including individual separate parts or elements (27, 34, 41, 45) of generally sector shape;
   said parts or elements are formed with inner engagement means (29, 30; 35, 37, 36;42, 43, 44; 46, 47, 48) for mutually supporting said parts or elements with respect to radial movement thereof; and
   wherein said individual separate parts or elements (27, 34, 41, 45) are formed with outer circumferential engagement means outwardly of said inner engagement means for holding said parts in circumferentially essentially clearance-free or play-free alignment in all shapes or positions which said separate parts or elements may assume.

2. The apparatus of claim 1, wherein said outer circumferential engagement means (28) hold said parts in essentially clearance or play-free position at least at the outer circumferential region or zone of said elements or parts when the elements or parts assume the conical position or shape, under influence of said movable means.

3. The apparatus of claim 1, wherein said outer circumferential engagement means comprise circumferentially extending projections (28) in mutual engagement with each other.

4. The apparatus of claim 3, wherein at least one of the circumferentially extending projections on each of said elements or parts (27, 34, 41, 45) is undercut, to permit deflection of the elements to form a system which changes from planar to conical position or shape, the undercutting permitting circumferential engagement upon such change in shape or position.

5. The apparatus of claim 3, wherein said projections (28) are in end surface engagement with each other when said system is in conical position or shape.

6. The apparatus of claim 1, wherein said elements or parts (27, 34, 41, 45) are mutually radially supported against each other regardless of the shape or position of the system formed by said parts, within a tilting angle about said fulcrum means (11, 20).

7. The apparatus of claim 1, wherein said inner engagement means radially inwardly of said outer engagement means additionally mutually supports said elements or parts (34, 41, 45) additionally in axial direction with respect to said shaft.

8. The apparatus of claim 1, wherein said inner engagement means inwardly of said outer engagement means is located in a radial region or zone positioned between said shaft (1) and said fulcrum means (11, 20).

9. The apparatus of claim 1, wherein said inner engagement means comprises a circumferentially extending projection (29) and a circumferentially extending recess (30) formed on each of said elements or parts (27), said projections and recesses of neighboring elements or parts forming interengaging projection-and-recess means.

10. The apparatus of claim 9, wherein said projection-and-recess means (29, 30) are formed with clearance and an undercut permitting mutual deflection about a deflection line extending in circumferential direction of said system and passing centrally through said projection-and-recess means to permit essentially play-free or clearance-free radial engagement of the elements or parts (27).

11. The apparatus of claim 1, wherein said elements or parts (34) include a projection (35) offset with respect to a plane parallel to the major surface of said element or part, said projection being formed with an elongated opening (37) extending in circumferential direction of said system, and a pin means (36) located opposite said projection for engagement in the opening formed in the projection of a neighboring element or part, said projection (35) with said elongated opening (37) therein and said pin means forming one or said engagement means.

12. The apparatus of claim 11, further including an oval head (39) on said pin means;
    said opening or hole (37) being elongated, and the major axis of the oval of the head and the elongation being twisted, with respect to each other, by about 90° when neighboring elements or plates (45) are positioned in said system.

13. The apparatus of claim 1, wherein said inner engagement means inwardly of said outer engagement means comprise a projection (42) extending in axial direction and at least approximately perpendicular to the major plane of an associated element or part (41), and formed with an axially extending elongated opening (43);
    and a hook means (44) extending from said element or part at a side thereof opposite said vertically extending projection, positioned and shaped to hook into the opening (43) of a neighboring element or part, said projection (42) and hook means (44) being unitary with the respective element or part (41).

14. The apparatus of claim 1, wherein one of said engagement means comprises at least one projection (46) unitary with a respective element or part (45) and extending in axial direction and essentially perpendicular to the major plane of the respective element or part, said projection being formed with an opening (47);
    and a circular spring (48) passed through the openings (47) of all said parts for radially and axially retaining said parts in a disk-shaped part system.

15. The apparatus of claim 1, wherein said planar shape or position of the ring disk defines a plane; and
    said movable means (18) deflects said ring disk between essentially planar shape or positions and conical shape or position at one side of said plane only.

16. The apparatus of claim 1, wherein said planar shape or position of the rink disk defines a plane; and
   said movable means (18) deflects said ring disk between essentially planar shape or position and conical shape or position at one side of said plane only.

17. A clutch comprising
   a first shaft (1) carrying a plurality of spaced clutch disks, radially extending from said first shaft;
   a second shaft (2) carrying a plurality of spaced clutch disks (5) interdigited with said first clutch disks (3);
   and means for compressing said interdigited clutch disks against each other, comprising nut means (6, 7, 8, 16, 15, 9, 11, 20) including
   a rind disk system (27, 34, 41, 45);
   circumferential means (14) for supporting said ring disk system at an outer circumference thereof and there locating said ring disk system at a predetermined position with respect to said second shaft;
   clutch operating means (18, 17, 19; F) forming movable means engageable with said ring disk system adjacent the circumference of the shaft for moving the center of the ring disk system,
   said operating means for the clutch including fulcrum means (11, 20) coupled to the ring disk system and engaging said ring disk system opposite said movable means at a radial position intermediate the outer circumference of the second shaft and the circumferential support means, said movable means, upon axial movement in a direction towards said fulcrum means, deflecting said ring disk system from essential planar shape or position into a conical shape or position or vice versa, and thereby applying a positioning force on said fulcrum means and hence move said first and second clutch disks (3, 5) in engagement with each other,
   wherein said ring disk system includes a plurality of individual plate-like separate parts or elements (27, 34, 41, 45) of generally sector-shape, surrounding said second shaft (2), said parts being formed with
   inner engagement means located radially inwardly on said sector-shaped parts or elements for mutually supporting said parts or elements with respect to radial movement of said parts or elements and holding said parts or elements in said ring disk system; and
   outer circumferential engagement means (28) being formed on said parts or elements (27, 34, 41, 45), said outer circumferential engagement means abutting each other and holding said parts in circumferentially essentially clearance-free or play-free position regardless of the shape or condition which said separate parts or elements may assume upon movement of said movable means.

18. The clutch of claim 17, wherein said outer circumferential engagement means (28) hold said parts in essentially clearance or play-free position at least at the outer circumferential region or zone of said elements or parts when the elements or parts assume the conical position or shape, under influence of said movable means.

19. The clutch of claim 17, wherein said elements or parts (27, 34, 41, 45) are mutually radially supported against each other regardless of the shape or position of the system formed by said parts, within a tilting angle about said fulcrum means (11, 20).

20. The clutch of claim 17, wherein said inner engagement means comprises a circumferentially extending projection (29) and a circumferentially extending recess (30) formed on each of said elements or parts (27), said projections and recesses of neighboring elements or parts forming interengaging projection-and-recess means.

21. The clutch of claim 17, wherein one of said elements or parts (34) include a projection (35) offset with respect to a plane parallel to the major surface of said element or part, said projection being formed with an elongated opening (37) extending in circumferential direction of said system, and a pin means (36) located opposite said projection for engagement in the opening formed in the projection of a neighboring element or part.

22. The clutch of claim 17, wherein said inner engagement means inwardly of said outer engagement means comprise a projection (42) extending in axial direction and at least approximately perpendicular to the major plane of an associated element or part (41), and formed with an axially extending elongated opening (43);
   and a hook means (44) extending from said element or part at a side thereof opposite said vertically extending projection, positioned and shaped to hook into the opening (43) of a neighboring element or part, said projection (42) and hook means (44) being unitary with the respective element or part (41).

* * * * *